(12) United States Patent
Jensen et al.

(10) Patent No.: US 9,254,458 B2
(45) Date of Patent: Feb. 9, 2016

(54) FILTER INLET

(71) Applicant: SIMATEK A/S, Høng (DK)

(72) Inventors: Arne Grønbæk Jensen, St. Fuglede (DK); Christian Dan Andersen, Høng (DK)

(73) Assignee: SIMATEK A/S (DK)

( * ) Notice: Subject to any disclaimer, the term of this patent is extended or adjusted under 35 U.S.C. 154(b) by 0 days.

(21) Appl. No.: 13/789,719

(22) Filed: Mar. 8, 2013

(65) Prior Publication Data

US 2014/0090342 A1  Apr. 3, 2014

Related U.S. Application Data

(63) Continuation-in-part of application No. 13/556,311, filed on Jul. 24, 2012, now abandoned, which is a continuation of application No. 12/310,297, filed as application No. PCT/DK2007/000380 on Aug. 20, 2007, now abandoned.

(30) Foreign Application Priority Data

Aug. 21, 2006 (DK) .................................. 2006 01088
Oct. 4, 2006 (DK) .................................. 2006 01284

(51) Int. Cl.
  *B01D 59/50* (2006.01)
  *B01D 46/00* (2006.01)
  *B01D 46/24* (2006.01)

(52) U.S. Cl.
  CPC .......... *B01D 46/002* (2013.01); *B01D 46/0046* (2013.01); *B01D 46/2407* (2013.01)

(58) Field of Classification Search
  CPC ..................................................... B01D 46/002
  USPC ............... 55/308, 341.1–341.7, 361–382, 48, 55/484, 337
  See application file for complete search history.

(56) References Cited

U.S. PATENT DOCUMENTS 3,831,354 A  8/1974  Bakke
4,156,600 A  5/1979  Jacobson
(Continued)

FOREIGN PATENT DOCUMENTS

BE  1008277 A3  3/1996
DE  3930765 C1  2/1991
(Continued)

OTHER PUBLICATIONS

International Search Report, for related International Application No. PCT/DK2007/000380, mailed on Nov. 30, 2007.
(Continued)

*Primary Examiner* — Thomas McKenzie
(74) *Attorney, Agent, or Firm* — Day Pitney LLP

(57) ABSTRACT

A filter including a filter housing with a horizontal partition wall dividing the filter housing into a dean-gas chamber and a dust chamber. The filter has an inlet part in open communication with the dust chamber. The inlet part is configured for supplying a dust-containing flow of gas to the dust chamber. The gas flow is conveyed through the filter elements and upwards into the dean-gas chamber where the filtered gas is discharged through a clean-gas outlet. In the filter housing, a cylindrical inner portion is arranged that encircles the filter elements. A round-going inlet part is opposed to the cylindrical inner part. The round-going inlet part has a larger diameter than at least a portion of the filter housing that adjoins the inlet part. Gas flow is divided into an upwardly and downwardly oriented gas flow controlled by arrangement of the cylindrical inner part.

20 Claims, 16 Drawing Sheets

(56) References Cited

U.S. PATENT DOCUMENTS

| | | | |
|---|---|---|---|
| 4,235,610 A | 11/1980 | Richard | |
| 4,521,231 A | 6/1985 | Shilling | |
| 4,878,926 A | 11/1989 | Goodrich | |
| 5,030,261 A * | 7/1991 | Giusti et al. | 55/326 |
| 5,032,153 A * | 7/1991 | Cattin | B01D 46/0046 55/282 |
| 5,096,476 A | 3/1992 | Hunsberger | |
| 5,120,333 A | 6/1992 | Davis | |
| 5,143,530 A | 9/1992 | Haldipur et al. | |
| 6,350,290 B1 | 2/2002 | Nadeau | |
| 6,740,142 B2 | 5/2004 | Buettner et al. | |
| 6,887,290 B2 | 5/2005 | Strauser et al. | |
| 7,182,799 B2 | 2/2007 | Dries et al. | |
| 7,344,577 B2 | 3/2008 | Berkhoel | |
| 2002/0073849 A1 | 6/2002 | Buettner et al. | |
| 2004/0055470 A1 | 3/2004 | Strauser et al. | |
| 2010/0077709 A1 * | 4/2010 | Jensen | B01D 46/002 55/308 |

FOREIGN PATENT DOCUMENTS

| | | |
|---|---|---|
| DK | 175107 B1 | 6/2004 |
| GB | 1295777 A | 11/1972 |
| WO | 9518662 A1 | 7/1995 |

OTHER PUBLICATIONS

Written Opinion of the International Searching Authority, for related International Application No. PCT/DK2007/000380.

International Preliminary Report on Patentability, for related International Application No. PCT/DK2007/000380, date of completion, Nov. 19, 2008.

* cited by examiner

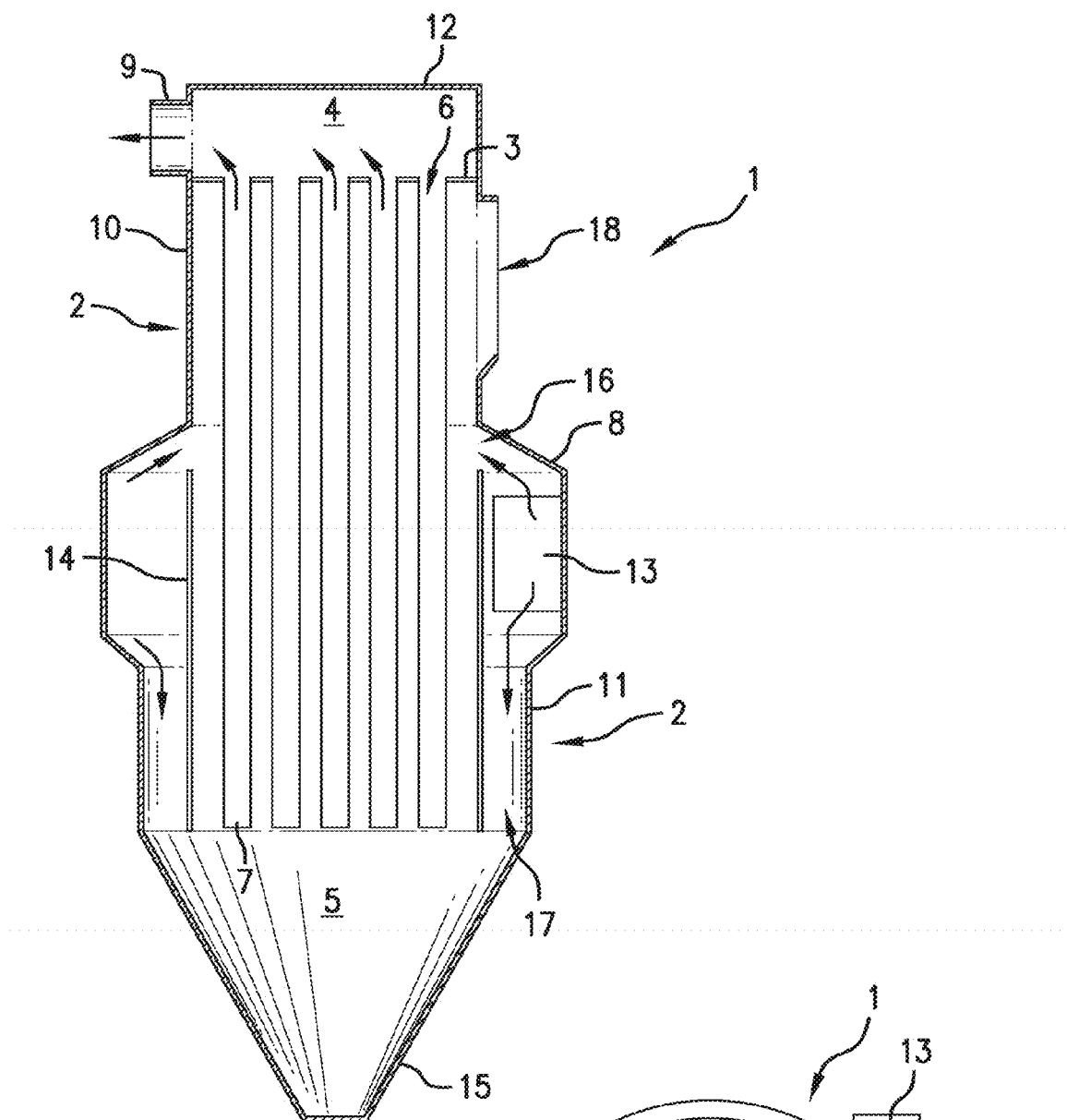
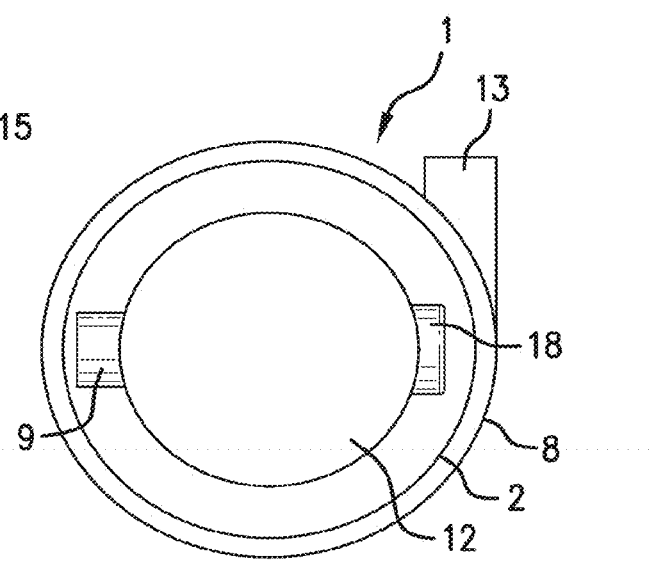
FIG.3
FIG.3A

FILTER INLET

CROSS-REFERENCE TO RELATED APPLICATIONS

The present application claims the benefit of priority to and is a continuation-in-part of U.S. patent application Ser. No. 13/556,311, filed Jul. 24, 2012, which in turn claims the benefit of priority to and is a continuation of U.S. patent application Ser. No. 12/310,297, filed Nov. 6, 2009, which in turn is a National Stage Entry of PCT/DK2007/000380, filed Aug. 20, 2007, which in turn claims the benefit of Danish Patent Application No. PA200601088, filed Aug. 21, 2006 and Danish Patent Application No. PA200601284, filed Oct. 4, 2006. The contents of each of the foregoing patent applications is incorporated by reference herein in its entirety for any purpose whatsoever.

FIELD

The disclosure relates to various embodiments of filters including a filter housing with a partition wall dividing the filter housing into a clean-gas chamber and a dust-gas chamber.

BACKGROUND

Filters are generally known. Filter elements can be provided that are inserted into the filler such as in the form of filler bags. Typically, the filler bags each comprise a wire cage on which a bag of filter material is mounted. The filler bags are suspended from a horizontal partition wall and extend downwards into a dust chamber to which the dust-containing gas or air is supplied and conveyed upwards across the partition wall through the filler bags. Hereby the dust particles deposit on the filler bag and drop down to the bottom of the filter housing from where they can be removed.

The same applies when other types of filler elements are used, be it bag fillers, as mentioned, but other fillers may also be concerned where filler material is attached to a kind of holder means. For instance, they may be filter cartridges, but any suitable filter material can be used.

When the dust-containing gas is supplied to the dust chamber opposed to the filler elements, a certain wear occurs on the filler elements, in particular the filler elements that are located most proximate the inlet. It was attempted to solve the problem of wear in Danish patent No. 175107 B1 by arranging a number of diffuser elements in the inlet part outside the filler housing, see patent disclosure DK 175107 B1.

However, the solution has a limitation with respect to the amount of product taken through the filter. In case of large amounts of product wear will occur—even in case diffuser elements are used.

What is usually taken through the filler is a flow of gas. The flow of gas is often atmospheric air, but in some cases it may be a kind of gas or a mixture of kinds of gases containing particles that are separated off the flow of gas in the filler. Thus, a product may be entrained in a flow of gas, which product is separated off in the filler, or particles may be involved that are undesirable in a flow of gas and are hence separated off.

Thus, it may be the gas or gases in the flow of gas which constitute a final or partial product or it may be the product that is separated off.

It may thus also be purified air or purified gas from flue gas or the like it is desired to accomplish.

In the following the term gas flow is used to designate the flow and the term gas is used in general. The product most often being particulate, the product will, in the following, be referred to as particles; however, obviously, the term particles is to be construed in its widest sense. The problem of having large amounts of particles in the gas is that the particles cause relatively much wear on e.g. the filter elements. This is typically solved by use of a pre-separator, e.g. in the shape of a cyclone.

A technique is known wherein gas and product are conveyed into the filter underneath the filter elements. Hereby the effect is accomplished that the major part of the product is separated off underneath the filter elements and drop down to the outlet of the filter. Thereby it is avoided that the particles that are contained in the gas flow are conveyed directly onto the filter elements.

However, this solution is associated with the drawback that a relatively large, upwardly oriented flow of gas passes between the filter elements which makes it difficult to clean the filter elements, the dust having to settle against the gas flow to leave the filter. In practice this means that a much larger filter than usual is to be applied to provide an upwardly oriented gas rate between the filter elements which is so low that the dust is able to drop against the gas flow.

SUMMARY

According to the disclosure it is possible to divide an ingoing gas flow into an upwardly and a downwardly oriented gas flow which is not taken directly to the filter elements in the filter. The distribution of how much of the gas flow that is oriented upwards compared to the amount that is oriented downwards can be controlled by arrangement of a cylindrical inner portion in the shape of an inner wrap that extends in the longitudinal direction of the filter and is arranged in the area of a round-going inlet part.

According to an alternative embodiment, the cylindrical inner portion may be configured such that the lower part of the inner wrap extends further down into the filter housing than the expanse of the round-going inlet part, seen in the longitudinal direction of the filter housing.

The round-going inlet part of the filter housing can be delimited in the longitudinal direction of the filter housing by transitions, the two transitions decreasing from a large diameter to the normal diameter of the filter housing in both the upwards and the downwards directions. To provide the most even transition possible, the transitions may preferably be conical, but any suitable transition can be used.

The filter housing may have a larger diameter than the diameter of the inner wrap, the same diameter as the diameter of the inner wrap, or a smaller diameter than the diameter of the inner wrap. If desired, the round-going inlet part can have a larger diameter than the inner wrap.

According to one embodiment, the inner wrap may be suspended such that it is adjustable in height relative to the filter housing, whereby the gas slots that occur in the upwards direction and the downwards direction by virtue of the location of the upper and the lower edges, respectively, on the inner wrap relative to the transitions between the round-going inlet part and the normal diameter of the filter housing can be adjusted.

Hereby modifications, if any, in amount and/or speed of the gas or air that passes through the filter can be adapted. A modification, if any, of composition and/or size of the particles that are to be filtered off the flow of gas can also be a parameter based on which an adjustment is conveniently made.

The ingoing gas flow can be divided into an upwards and a downwards gas flow that is not taken directly to the filter elements in the filter by arrangement of a cylindrical inner part in the form of an inner wrap extending in the longitudinal direction of the filter and is arranged in the area of a round-going inlet part, however, the effect may occur that the gas flow will rotate at high speed as the gas flow will rotate "into itself" and hence provide a self-increasing effect to the rotation.

By a further embodiment in which the cylindrical inner part is provided with a kind of rotation brake or rotation breaker, improved distribution of the flow of air is accomplished in the upward and downward directions and that the rotation of the air or gas flow is reduced in the area around the filter inlet.

This can be accomplished in that, between the filler housing and the cylindrical inner part, a partition body can be provided in the shape of a rotation breaker that conveys at least a portion of the gas flow conveyed around the space formed between the inner side of the filter housing and the outer side of the cylindrical inner part, to the effect that the gas flow is deflected in an upwards and/or downwards direction by the rotation breaker. Therefore the gas flow is unable to rotate in the same horizontal plane.

Thus, the partition body can serve as a rotation brake or rotation breaker, the partition body breaking the rotation of the gas flow to the effect that the gas flow does not continue to rotate around the inlet of the filter housing.

Without the rotation breaker the gas flow will rotate in the inlet of the filter housing due to the gas entering through the inlet continuing its path along the inside of the filter housing in the space that is formed between the inner side of the filter housing and the outer side of the cylindrical inner part, and when the particle-containing gas flow comes around, it will be admixed with and accelerated upwards from the particle-containing flow of gas that enters by the inlet. The ensuing high rate of rotation will affect the filter elements to cause them to oscillate when the gas flow is, in a helical path, conveyed upwards across and/or down below the upper or lower edges of the inner cylindrical part. When the filter elements are caused to oscillate, they will strike against each other and are thus damaged.

The rotation breaker may be configured as a body that doses completely against the cylindrical inner part and against the inner side of the filter housing. This means that the particles that follow the inner side of the filter housing are conveyed in upwards and/or downwards directions past the partition body whereby the rotation is broken.

The rotation breaker may also be configured as a body that doses completely against the cylindrical inner part, while there is a small opening between the inner side of the filter housing and the rotation breaker. This means that the particles that follow the inner side of the filler housing get through and continue along. Hereby a dynamic separation process is generated where the particles follow a helical path around the filter and down towards the bottom of the filler.

The rotation breaker may be configured with a plane surface and may consist of one or more parts of plane surfaces. The rotation breaker may also be configured with a curved surface or may consist of one or more portions of curved surfaces. According to one embodiment the plane surface(s) may be formed from one or more sections of plates.

According to other embodiments the rotation breaker may be constituted by other spatial figures. The essential aspect of the rotation breaker or the rotation breakers is that it/they can be arranged at the inlet of the filler and are able to cut off entirely or partially the flow of gas to the effect that the rotation of the flow of gas is broken.

By providing the cylindrical inner portion with a number of essentially horizontally extending plates in connection with the rotation breaker, the amount of air is distributed more uniformly around the filler, the gas flow being pressed up and down, respectively, relative to the inlet area.

By configuring the essentially horizontally extending plates such that they are widest at the rotation breaker and subsequently decrease in width in pace with the distance to the rotation breaker being increased and seen against the flow direction, the effect is accomplished that the flow of gas is distributed more uniformly around the filter—upwards as well as downwards.

This means that the gap that is produced between the inner side of the filter housing and the essentially horizontally extending plates can be configured such that the distance between the gaps is changed more or less evenly or such that the change takes place in leaps.

The essentially horizontally extending plates may extend along the entire circumference of the cylindrical inner part without forming a gap between plate and the inner side of the filter housing. Instead the plate or the plates can be configured with holes, which holes may be of different sizes. The holes may also be arranged in accordance with a specific pattern to obtain a particular distribution of gas flow and/or particles.

According to an alternative embodiment the rotation breaker may be mounted displaceably by ordinary displacement means to the effect that the rotation breaker, optionally along with the essentially horizontally extending plates, is displaced at least along a portion of the circumference of the cylindrical inner part.

According to yet another embodiment the essentially horizontally extending plates may be configured to support or be secured on the inner side of the filter housing and such that a gap is formed between the horizontally extending plate(s) and the cylindrical inner portion.

An alternative embodiment of the filter a rotation breaker can be provided by a number of plates formed as protrusions extending from the cylindrical inner part of the filter and extending outwards in an angle towards the filter housing.

In yet an alternative embodiment of the filter the rotation breaker can be provided by a number of plates formed as protrusions extending from the inner side of the filter housing and extending inwards in an angle towards the cylindrical inner part.

In an embodiment the protrusions can be arranged in a radial direction in relation to a vertical axis that extends through the centre of the filter.

In another embodiment the protrusions can be arranged with an equal mutual distance between each other.

In another embodiment the protrusions can be arranged in groups along an inner perimeter of the filter housing, each group distributed with an equal mutual distance between each other.

In yet another embodiment the plates can be arranged in an angle between 0 and 80° in relation to a vertical axis that extends through the centre of the filter.

In a further embodiment a number of protrusions can be arranged along the upper end of the round going inlet part and a number of protrusions can be arranged along the lower end of the round going inlet part.

In an embodiment of the above, the upper protrusions can be arranged in an angle between 0 and 80° in relation to a vertical direction, preferable in an angle between 30 and 60°, more preferably 45° in relation to a vertical axis that extends through the centre of the filter.

Further the lower protrusions can be arranged in an angle between 0 and 80° in relation to a vertical axis that extends through the centre of the filter, preferable in an angle between 0 and 30°, more preferably in an angle between 0 to 5° in relation to a vertical axis that extends through the centre of the filter.

In yet an alternative embodiment of the filter the rotation breaker can be provided by a number of plates formed as protrusions extending from the inner side of the filler housing and extending inwards in an angle towards the cylindrical inner part.

The plates forming the rotation breaker can be fixed to the cylindrical inner part, to the inner side of the filler housing or a combination hereof.

The above alternative embodiments ensure a minimum of horizontal surfaces and thereby contribute to the solution of several problems which can occur when treating certain materials in the filler. Products which can cause growth of bacterial cultures can rest on a rotation breaker if the rotation breaker is situated in horizontal position.

It is also possible that certain products treated in the filler can self-ignite and thereby cause fire within the filler housing if the product is accumulating on i.e. shelf-like elements of for example a rotation breaker positioned in a substantial horizontal position.

If the rotation breakers are configured horizontally a layer of product can be formed, which layer can obtain a considerable thickness. If such a layer is situated in the filter over a certain time, a risk for bacterial growth and self-ignition will increase.

When treating products having a tendency for caking together, there is a risk that dogging can occur, which will reduce the efficiency of the filter.

Such situations can also cause discoloration of the product. The above disadvantages can lead to a reduced quality of the end product. By breaking the rotation of the gas flow in this manner, improved distribution of the gas flow in the filter is accomplished.

This disclosure relates to a way in which even very large amounts of product can be handled in a filter without a pre-separator being mounted before the filter and without considerable wear to the filter elements.

It is an object of the present disclosure to provide a structure that solves this problem. This is accomplished by a cylindrical inner part being arranged in the filter housing and encircling the filter elements at least through a part of the length of the filter elements; and in that, on the filter housing opposed to the area where the cylindrical inner part is arranged, a round-going inlet part is configured, which inlet part has a larger diameter than at least a part of the filter housing that adjoins the inlet part.

In this way, the filter elements are protected against direct influence by the particles in the gas flow and hence against wear caused by such influence. By using a construction with a cylindrical inner part encircling the filter elements, a so-called inner wrap, gas with particles is conveyed into an integrated pre-separator chamber which is formed between inner wrap and a filter housing.

According to the disclosed embodiments, a convenient manner is provided in which to collect, at the bottom of the filter housing, the particles that leave the gas flow. According to disclosed embodiments it is enabled that the collection of particles may take place directly into a silo intended therefore. According to disclosed embodiments it is accomplished that it is possible to arrange the cylindrical inner portion such that a convenient distribution of the gas flow results, both above the cylindrical inner portion (the inner wrap) and below the cylindrical inner portion.

According to disclosed embodiments it is accomplished that the cone at the bottom of the filler housing can also be used to adjust the passage of gas that occurs between the cylindrical inner part and the lower part of the filler housing to bring about a convenient distribution of the gas flow both above the cylindrical inner portion (the inner wrap) and below the cylindrical inner portion.

Disclosed embodiments enable a way in which to exchange filler elements by use of an opening with a door or hatch in the upper part of the filler housing when, for various reasons, it is undesirable to exchange the fillers through the top part. Disclosed embodiments describe convenient embodiments of accesses to the inlet part through which the gas flow is supplied.

Disclosed embodiments enable a setting option for the cylindrical inner part for individual adaptation in accordance with various parameters, e.g. the gas flow for optimum distribution of the gas flow—both above the cylindrical inner part (the inner wrap) and below the cylindrical inner wrap.

According to disclosed embodiments it is accomplished that the gas flow is interrupted such that it is unable to rotate in essentially the same horizontal plane.

By a filter according to disclosed embodiments, an embodiment of the filter is provided that features a rotation breaker enabling particles to pass between rotation breaker and filter housing.

Disclosed embodiments provide a further embodiment of the filter with the rotation breaker that allows particles to pass through one or more openings in the rotation breaker.

According to disclosed embodiments, the described plate or edge enables that a larger part of the gas flow is pressed upwards from the inlet area, a larger counter-pressure being thus generated for the path of the gas underneath the cylindrical inner part and up between the filler elements.

According to disclosed embodiments it is accomplished that it is possible, in the filler, to adapt the rotation breaker by a number of plates that extend from the rotation breaker and around the gap between the inner side of the filler housing and the outer side of the cylindrical inner part to obtain convenient flow through the filter.

When a certain amount of particles have deposited on the filler elements and it is desired to release them from the filler elements, such release of the particles can be accomplished in a usual manner by means of a cleaning pulse or by turning the gas flow. Thereby the particles are released and they drop to the bottom of the filler housing.

In one implementation, the disclosure provides a filter having a filter housing. The filter housing includes an essentially horizontal partition wall dividing the filter housing into a clean gas chamber and a dust chamber disposed below the clean gas chamber, the partition wall defining a plurality openings therethrough. The housing further includes a plurality of filter elements secured to and extending downwardly from the partition wall into the dust chamber, an inlet in fluid communication with the dust chamber, the inlet part being configured to permit passage of a dust-containing flow of gas therethrough into the dust chamber, an outlet in fluid communication with the clean gas chamber for directing a cleaned gas flow out of the filter housing, and a generally cylindrical barrier proximate the inlet disposed in the dust chamber surrounding the downwardly extending filter elements. The inlet, cylindrical barrier, dust chamber, and filter elements cooperate to define a flowpath wherein incoming gas into the filter housing is conveyed through the inlet, past the cylindrical barrier filter, through the filter elements, upwardly through the plurality of openings into the clean-gas chamber and out of the filter housing through the outlet. The flowpath is divided by the generally cylindrical barrier, such that a first portion of the flowpath is defined over a top of the generally cylindrical barrier into the dust chamber, and a second portion of the flowpath is defined under a bottom of the generally cylindrical barrier into the dust chamber.

In some implementations, the clean gas chamber resides in an upper, cylindrical part of the filter housing, the dust chamber resides in a lower, cylindrical part of the housing, and the inlet resides in an intermediate portion of the filter housing between the upper and lower cylindrical parts of the housing. An outer portion of the intermediate portion of the housing can cooperate with the generally cylindrical barrier to define an annular flow space therebetween for inducing flow along a direction that passes along the curvature of the generally cylindrical barrier. The lower, cylindrical part of the filter housing can be connected at a lower end to a conical portion of the filter housing for collecting particles separated from a gas stream passing through the filter housing. An upper edge of the generally cylindrical barrier can be downwardly displaced from an inner surface of the filler housing to define an upper generally annular flow opening between the inlet and the dust chamber. A lower edge of the generally cylindrical barrier can be upwardly displaced from an inner surface of the dust chamber to define a lower generally annular flow opening between the inlet and the dust chamber. The generally cylindrical barrier can be concentrically disposed within an outer wall of the dust chamber. The generally cylindrical barrier can extend downwardly into a conically-shaped portion of the dust chamber. An opening can be defined through an upper portion of the filler housing for removing filler elements. The inlet can be disposed radially outwardly from a central axis "Y" of the filler housing.

The inlet can be disposed tangentially along an outer edge of the filler housing. If desired, the generally cylindrical barrier can be moveable longitudinally within the filler housing to control the flow through the filler housing. If desired, the filler can further include at least one rotation breaker disposed between the filter housing and the generally cylindrical barrier. The at least one rotation breaker can be arranged to decrease rotational velocity of a gas flow passing through the filter. The at least one rotation breaker can deflect flow in at least one of an upward and downward direction. The at least one rotation breaker can extend outwardly from the generally cylindrical barrier toward an inwardly facing wall of the housing. The rotation breaker can have a free end that defines an elongate gap in cooperation with the inwardly facing wall of the housing. Particles entrained in a gas flow can be allowed to pass through the elongate gap to facilitate their separation from the gas flow.

In some implementations, the at least one rotation breaker can define one or more holes therethrough. The at least one rotation breaker can include a plurality of plates formed as protrusions extending outwardly at an angle from the generally cylindrical barrier toward an inner facing wall of the filter housing. The at least one rotation breaker can include a plurality of plates formed as protrusions extending inwardly at an angle from an inwardly facing wall of the filter housing toward the generally cylindrical barrier. The at least one rotation breaker can include a first plurality of plates formed as protrusions extending outwardly at an angle from the generally cylindrical barrier toward an inner facing wall of the filter housing and a second plurality of plates formed as protrusions extending inwardly at an angle from the inwardly facing wall of the filter housing toward the generally cylindrical barrier.

In some embodiments, at least one rotation breaker can be radially outwardly oriented in relation to a vertical axis that extends through the center of the filter. The at least one rotation breaker can include a plurality of radially distributed plates disposed between the generally cylindrical barrier and an inwardly facing wall of the housing, the plates being arranged with a substantially equal toroidal angular distance between each other. The at least one rotation breaker can include a plurality of radially distributed plates disposed between the generally cylindrical barrier and an inwardly facing wall of the housing, the plates being arranged in groups along an inner perimeter of the filter housing, each group distributed with an equal mutual distance between each other.

In some embodiments, the at least one rotation breaker can be arranged at an angle between 0 and 80° in relation to a vertical axis that extends through a center of the filter. If desired, the filter can include a first plurality of rotation breakers arranged proximate an upper end of the generally cylindrical barrier and a second plurality of rotation breakers arranged proximate a lower end of the generally cylindrical barrier. The first and/or second plurality of rotation breakers can be arranged in an angle between 0 and 80°, 30 and 60°, or about 45° in relation to a vertical axis that extends through the center of the filter.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the methods, systems and devices of the present invention. Together with the description, the drawings serve to explain the principles of embodiments of the invention.

DESCRIPTION OF THE DRAWINGS

Embodiments of the disclosure will now be explained in further detail with reference to the drawing, wherein:

FIG. 3 schematically shows a cut-through filler with a tangentially arranged access to the filler inlet;

FIG. 3A shows the filler of FIG. 3, seen from above; and

DETAILED DESCRIPTION

Figure 1:
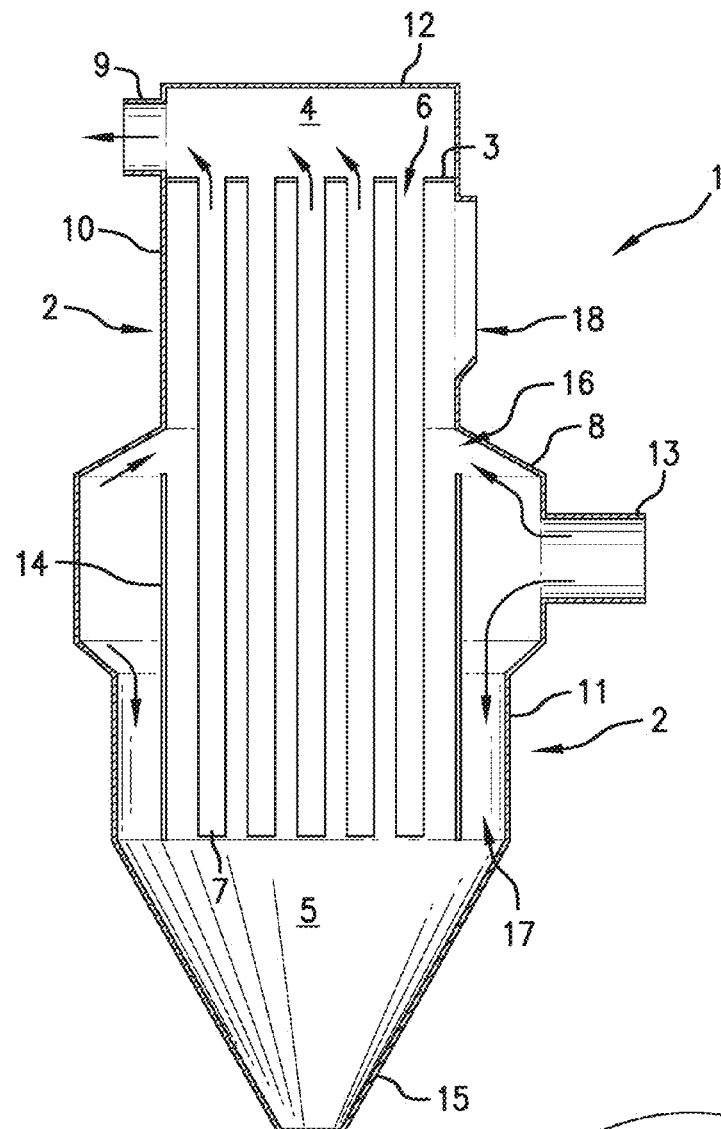
FIG. 1 schematically shows a cut-through filler with a radially arranged access to the filler inlet.

Now, convenient embodiments of the disclosure will be described with reference to the drawing.

According to a first embodiment the disclosure includes a filler 1 having a filler housing 2 with a substantially horizontal partition wall 3 that divides the filler housing 2 into a dean-gas chamber 4 and a dust chamber 5, said partition wall 3 being provided with a number of openings 6 in which a plurality of filler elements 7 are arranged that are secured to the partition wall 3 and extend down into the dust chamber 5; which filler 1 is provided with an inlet 13 which is, via an inlet part 8, in open communication with the dust chamber 5, said inlet part 8 being configured for introduction of a dust-containing gas flow to the dust chamber 5 from where it is possible to suck through the filler elements 7 and into the dean-gas chamber 4 from where the filtered gas is discharged through a pure-gas outlet 9. The gas flow to the dust chamber 5 can also be conveyed through the filler elements by super-atmospheric pressure, by natural convection or the like.

The filter housing 2 includes a circumferential, or round-going filler inlet part 8 that divides the filler housing 2 into an upper part 10 and a lower part ii. The upper part 10 of the filler housing 2 is preferably finished by a top part 12 to which a discharge pipe or the like can be coupled for a discharge gas that leaves the filter through the clean-gas outlet 9 of the top part 12.

Gas containing particles are fed through an access or inlet 13 and into a pre-chamber in the form of the round-going inlet part 8. From the inlet part 8 the gas and the product is advanced into the filter 1. The gas with particles are conveyed partially across a cylindrical inner part, also designated an inner wrap 14, and around filter elements 7 and partially underneath the inner wrap 14 and up between the filter elements 7.

The filter elements 7 are arranged to align with holes 6 in the substantially horizontal partition wall 3 to the effect that they are suspended from the horizontal partition wall 3 and down into the dust chamber 5 to which the dust-containing gas or air is supplied and sucked above the partition wall 3 through the filter elements 7. The dust particles are hereby deposited on the filter elements 7 and drop to the bottom 15 of the filter 1, from where they can be removed.

When a certain amount of particles have settled on the filter elements 7 and it is desired to release them from the filter elements 7, it is possible, in a usual manner, to release the particles by means of a cleaning pulse or by reversing the gas flow. Thereby the particles are released and they drop to the bottom 15 of the filter housing 2. The bottom 15 may be configured as a cone or conical part that tapers downwardly, but the bottom 15 may also be curved or plane. According to a particular embodiment the bottom is optional, the filter 1 being arranged directly on top of a silo (not shown).

By configuring the inlet part 8 such that a larger counter-pressure is formed for the gas' path down below the inner wrap 14 and up between the filter elements 7 compared to the counter pressure for gas' path up above the inner wrap 14 and in between the filter elements 7, the effect is accomplished that a larger amount of gas is conveyed above the inner wrap 14 than is conveyed below the inner wrap 14. By arranging the inner wrap 14 relative to the inlet part 8 such that a passage 16 is formed between the upper edge of the inner wrap 14 and the transition of the inlet part 8 between inlet part 8 and the upper part 10 of the filter housing 2, said passage 16 having a larger cross-section or clearance than a passage 17 formed between the lower part of the inner wrap 14 and the transition between inlet part 8 and the lower part 11 of the filter housing 2. As will be appreciated, passages 16 and 17 can be generally annular in shape, as viewed from the top of the filter 1.

Here, the inner wrap 14 may have the same diameter as at least one of the upper 10 and the lower 11 parts of the filter housing, and in a particular embodiment both the inner wrap 14 and the upper 10 and lower 11 part of the filter housing 2 may have the same diameter.

According to yet another embodiment, the inner wrap 14 can be positioned relative to the inlet part 8 such that a passage 16 is formed between the upper edge of the inner wrap 14 and the transition of the inlet part 8 between inlet part 8 and the upper part 10 of the filter housing 2, said passage 16 having a larger cross section or clearance than a passage 17 formed between the lower part of the inner wrap 14 and the lower part ii of the filter housing 2. According to a further embodiment the passage 17 may be configured between the lower part of the inner wrap 14 and the cone 15 of the filter 1. According to a particular embodiment, the upper part 10 of the filter housing 2 may have the same diameter, but different diameters for upper 10 and lower 11 part of the filter housing are also applicable.

By suspending the inner wrap 14 to be adjustable in height in the filler 1 by means of ordinary means for performing height adjustment in such a manner that the location of the inner wrap 14 can be set in height relative to the filler housing 2, the distribution of the gas flow in the filler housing 2 can be adjusted. These common means can be in the shape of longitudinally extending slots in which a bolt may travel and be secured. It may be chains that are secured to the partition wall 3 of the filler, which chains can be fixed with a given length to the inner wrap, or it may be stays in the form of threaded spindles that set the location of the inner wrap 14. However, it is of no particular consequence which means are used to perform such height adjustment, the essential aspect being that such adjustment of the location of the inner wrap 14 relative to the filter housing 2 is indeed performed, whereby the two passages 16, 17 can be adjusted relative to each other and hence be adapted to the rate of the gas flow, its density, particle size and like parameters.

Hereby it is possible to convey the major part of the bulk of gas above the inner wrap 14 and in between the filler elements 7, while simultaneously a relatively small, upwards gas flow results between the filter elements 7. Since the major part of the bulk of gas is conveyed above the inner wrap 14, it will bring about the effect that, in the upper part of the filler 1, and relatively far towards the bottom of the filler elements, a downwards gas flow results between the filter elements 7.

Figure 1A:
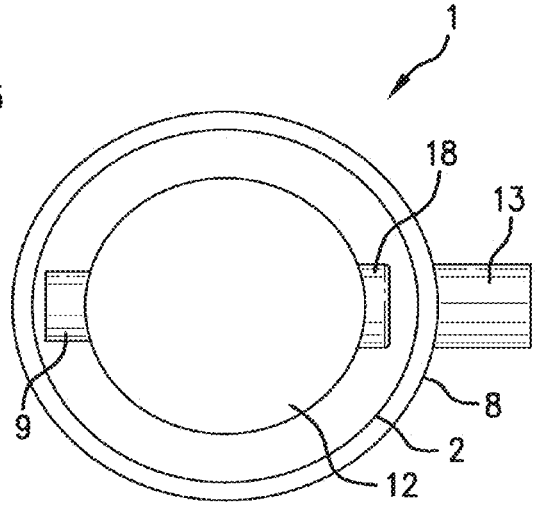
FIG. 1A shows the filter of FIG. 1, seen from above.
Figure 2:
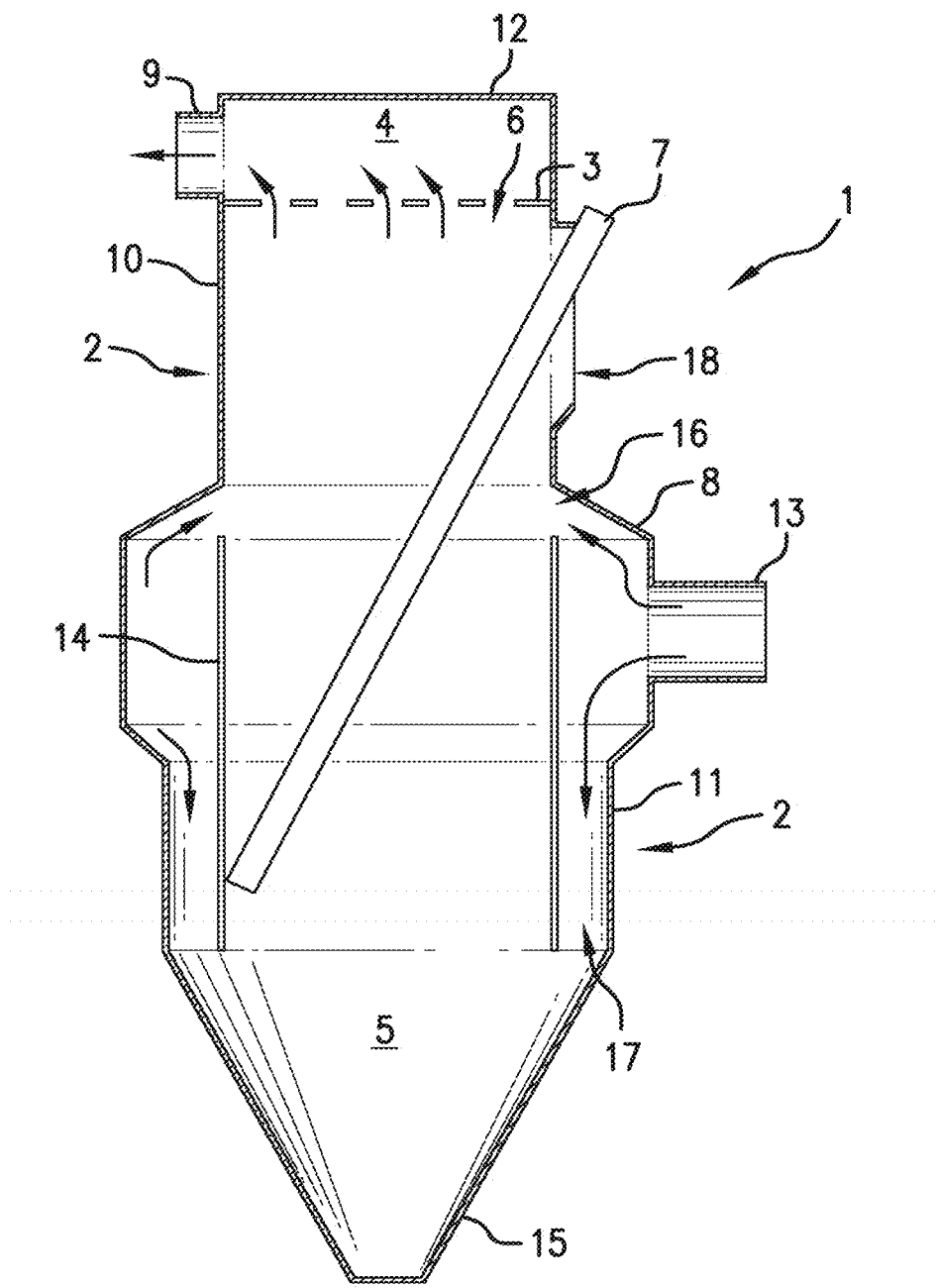
FIG. 2 schematically shows a cut-through filler with a radially arranged access to the filler inlet, wherein it is indicated that a filler element can be exchanged through a door intended therefor.

As shown in FIGS. 1, 1A and 2, the gas can be conveyed into the round-going inlet part 8 by means of a radially arranged access 13.

Figure 4:
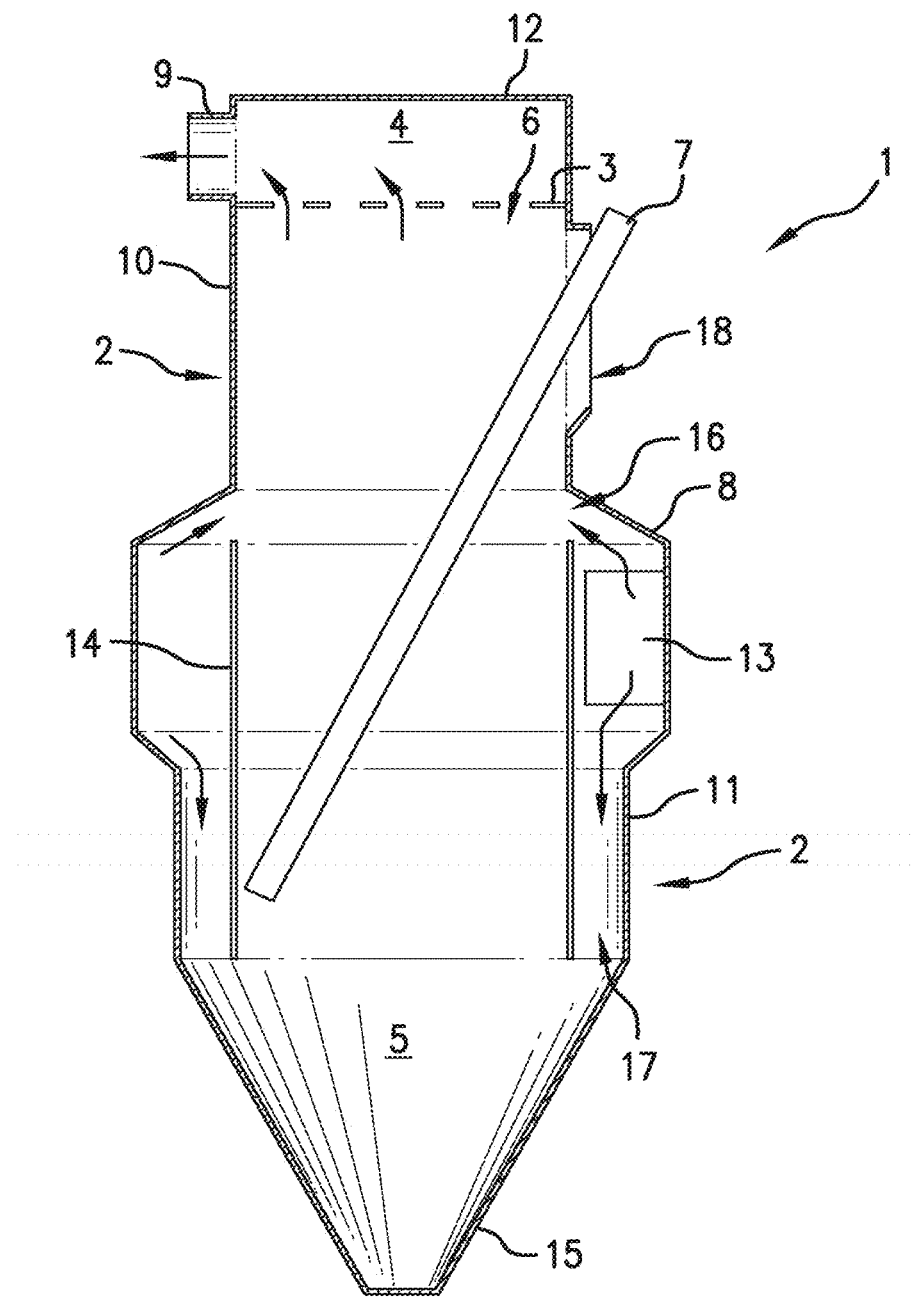
FIG. 4 schematically shows a through-cut filler with a tangentially arranged access to the filler inlet, wherein it is indicated that a filler can be exchanged through a door intended therefor.

As shown in FIGS. 3, 3A and 4, the gas may also be conveyed into the round-going inlet part 8 by means of a tangentially arranged access 13. When the gas flow is conveyed into the inlet part 8 through a tangentially arranged access 13, a certain cyclone effect results, the particles being caused to enter a path around the inner wrap 14 and slowly dropping in a helical path towards the opening between inner wrap 14 and filter housing 2 and/or cone 15. The gas flow will, in this context, too, be distributed above the inner wrap 14 through the passage 16 and below the inner wrap through the passage 17.

According to yet another embodiment, it is an option, to further ensure that the flow of air is distributed in upwards and downwards directions, to provide the cylindrical inner part with some kind of rotation brake or rotation breaker. Hereby improved distribution of the flow of air in upwards and downwards directions will result. Moreover, it is accomplished that the rotation of the gas flow in the area around the filter inlet is not caused to rotate "into itself" and thereby a sell-increasing rotation of the flow of air or gas into the inlet part 8 is obviated.

Figure 5:
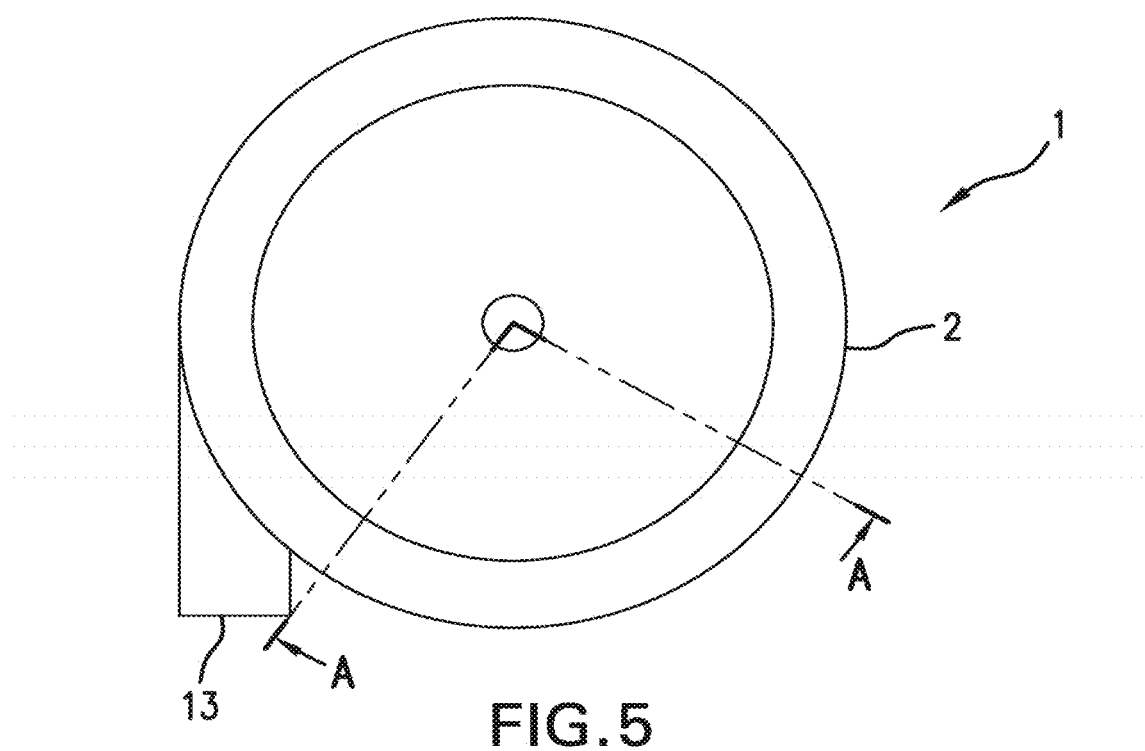
FIG. 5 shows a filler, seen from above, with cylindrical inner part and with partition body.
Figure 6:
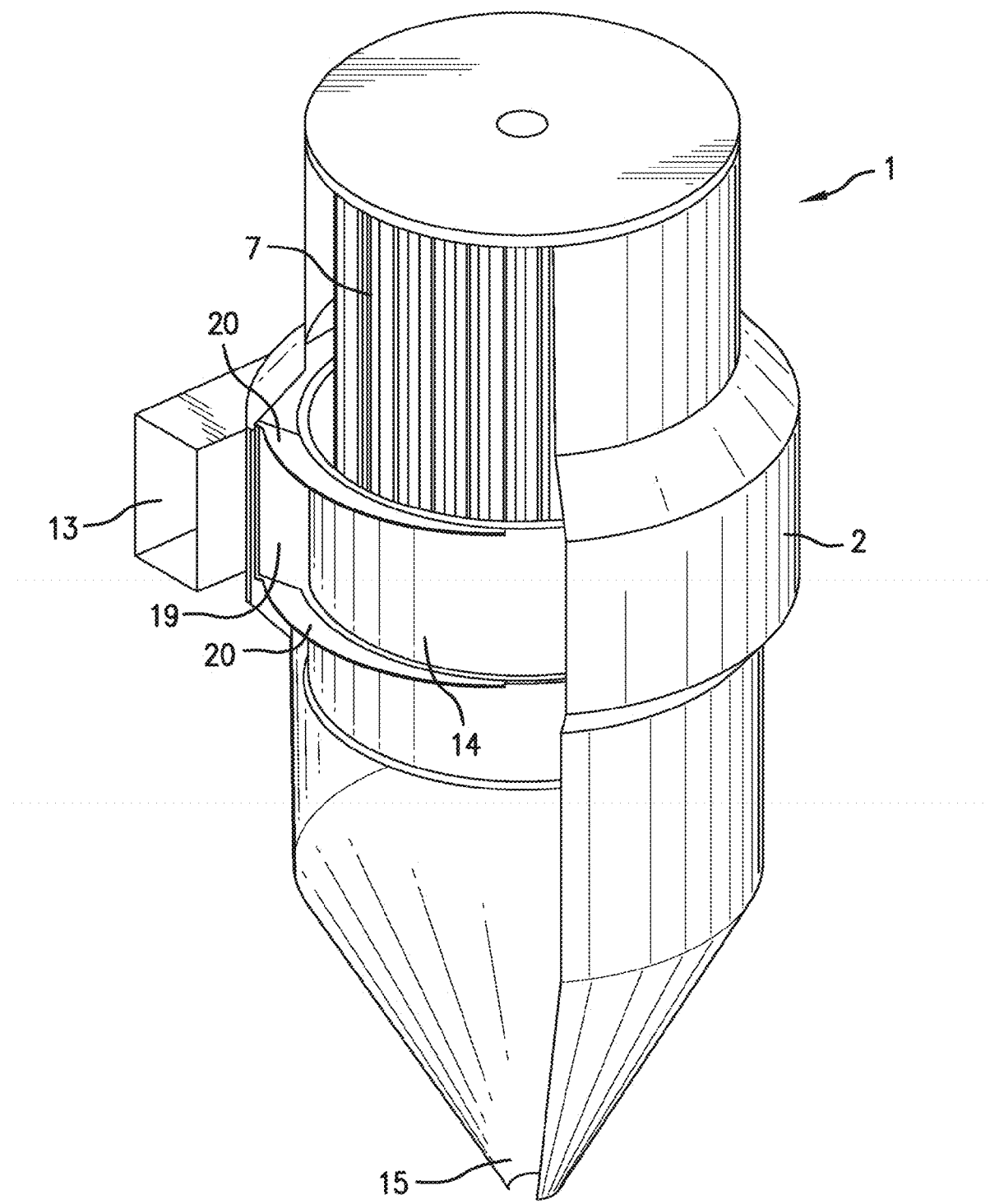
FIG. 6 shows the filler of FIG. 5, seen along partial section A-A.
Figure 8:
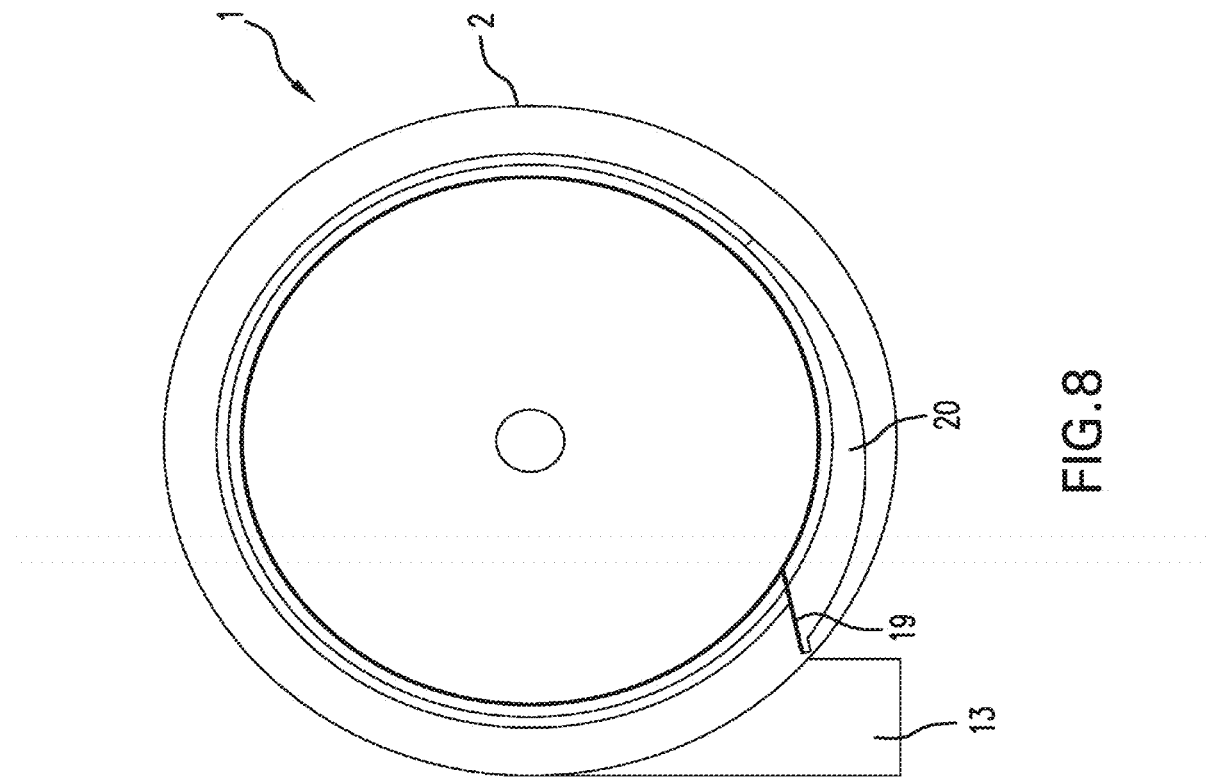
FIG. 8 shows the filler of FIG. 7, seen along section B-B.
Figure 7:
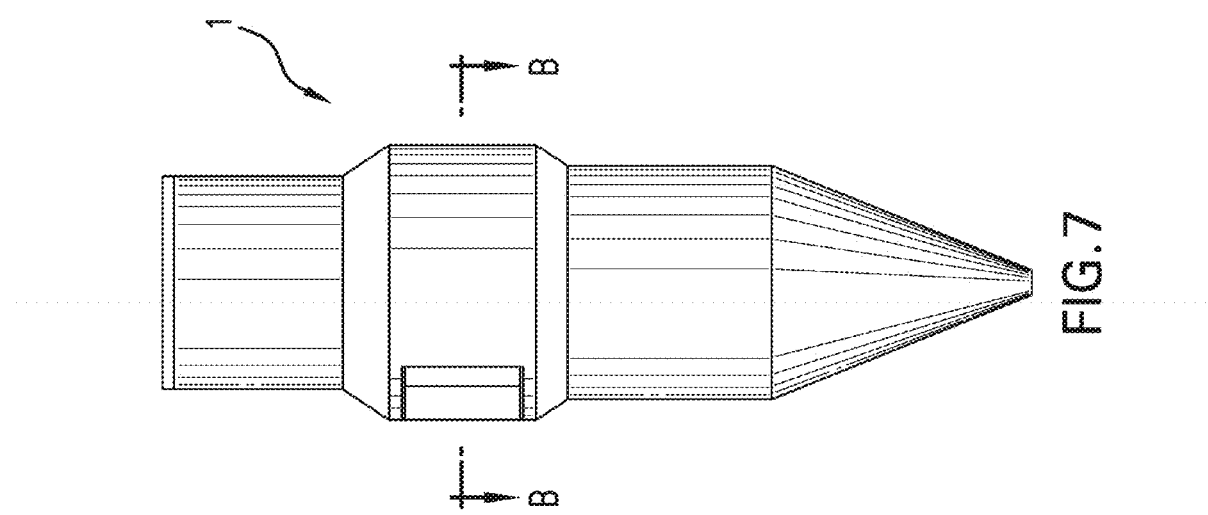
FIG. 7 shows a filler with indication of the location of section B-B.
Figure 10:
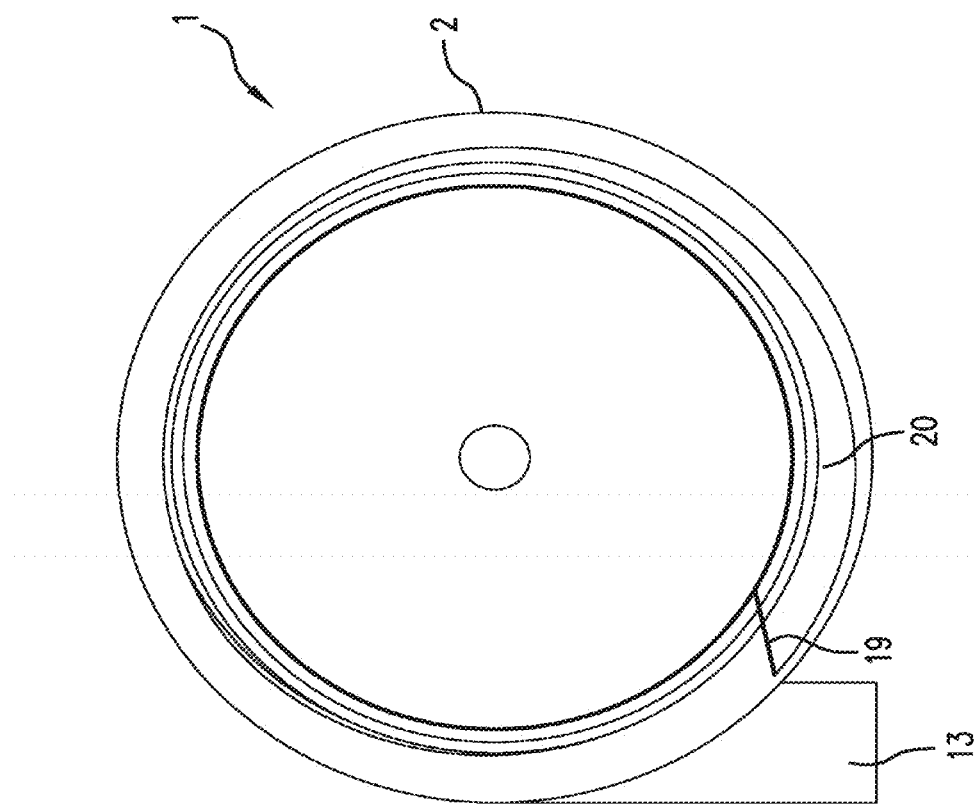
FIG. 10 shows the filter of FIG. 9, seen along section C-C.
Figure 9:
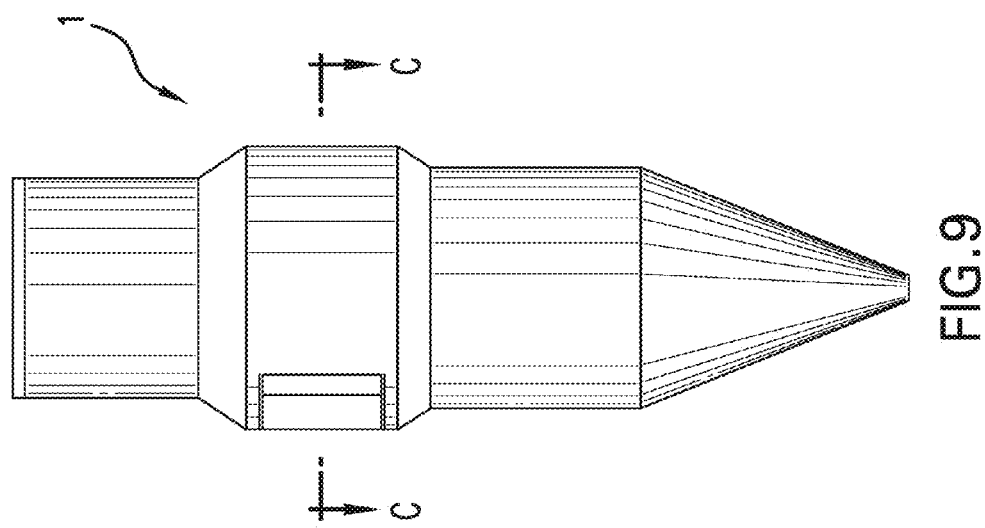
FIG. 9 shows a filter with indication of the location of section C-C.

This is accomplished in that, as shown in FIGS. 5 and 6, between the filter housing 2 and the cylindrical inner part 14, a partition body 19 is arranged that prevents the gas flow from rotating in the same horizontal plane. As illustrated, the partition body is generally vertically oriented (parallel to a central longitudinal axis of the filter), and acts as a flow obstacle to prevent toroidal flow around the annulus defined between sleeve 14 and the outer housing of the filter.

Thus, the partition body 19 functions as a rotation brake or rotation breaker, the partition body 19 breaking the rotation of the gas flow to the effect that at least a portion of the gas flow that is conveyed around the gap formed between the inner side of the filter housing 2 and the outer side of the cylindrical inner portion 14, is thus deflected in an upwardly oriented and/or downwardly oriented direction by the rotation breaker 19. Therefore the gas flow is unable to rotate in the same horizontal plane.

Without rotation breaker 19 the gas flow will rotate within the filter housing toroidally 2 due to the air or gas entering through the inlet 13 continuing to move along the inner side of the filter housing 2 in the gap that is formed between the inner side of the filter housing 2 and the outer side of the cylindrical inner part 14, and when the particle-containing gas flow comes around, it will be admixed with and accelerated by the particle-containing gas flow that enters through the inlet 13. The high speed of rotation that occurs as a result of this will influence the filter elements 7 to the effect that they are caused to oscillate. When the filler elements 7 are caused to oscillate, they will strike against each other and hence be damaged.

The rotation breaker 19 may be configured as a body 19 that adjoins snugly against the cylindrical inner part 14 and against the inner side of the filler housing 2. This causes the particles that follow the inside of the filter housing 2 to be conveyed in the upwards direction or downwards direction past the rotation breaker 19, whereby the rotation is broken. The rotation breaker could be a solid obstacle, can have holes 19A therethrough, or could be made from a filter material or a fine mesh, as desired, as long as it acts to slow or prevent the toroidal flow.

The rotation breaker 19 can also be configured as a body 19 that adjoins snugly against the cylindrical inner part 14 while there is a narrow opening between the inner side of the filter housing 2 and the rotation breaker. This means that the particles that follow the inner side of the filter housing 2 are allowed through and continue along. Hereby a dynamic separation process is generated where the particles follow a helical path around the filter 1 and down towards the bottom 15 of the filter 1.

The rotation breaker 19 can also be configured with a plane surface and may consist of one or more sections of plane surfaces. The rotation breaker 19 can also be configured with a curved surface or may consist of one or more sections of curved surfaces. According to one embodiment the plane surface(s) may be formed from one or more pieces of plate.

According to other embodiments the rotation breaker 19 may be constituted of other spatial figures. The essential aspect of the rotation breaker 19 or partition body is that it can be arranged at the inlet 13 of the filter 1 and that it is able to block off the flow of gas to the effect that the rotation of the gas flow is broken.

In order to obtain a more convenient distribution of the flow of gas along the inner side of the filter housing 2 and above and below, respectively, the edges of the cylindrical inner portion 14, a number of plates can be arranged that are secured along the inside of the filler housing 2 or the inlet 13 or tube 14, said plates preferably extending about the entire circumference of the filler. The plates may be essentially horizontal or may have an inclination that points inwards/downwards relative to a vertical axis that extends through the center of the filler 1.

By arranging these plates in connection with the cylindrical inner part 14, it is accomplished that a larger part of the gas flow is pressed upwards from the inlet area, a larger counter-pressure being formed for the gas' path down below the cylindrical inner portion 14 and up between the filter elements 7. Hereby the effect is accomplished that a larger amount of gas is conveyed above the cylindrical inner portion 14 which contributes to ensuring a relatively slow upwards gas flow between the filter elements.

According to one embodiment the plates that are arranged in/secured to the filler housing 2 can be supplemented with a number of plates that are secured to the rotation breaker 19.

By providing the rotation breaker 19 with a number of plates 20 that extend at least along a portion of the circumference of the cylindrical inner part 14, an even more convenient and uniform distribution of the amount of air circulating the filter 1 is accomplished, the gas flow being pressed upwards and downwards, respectively, from the inlet area.

The plates 20 that are arranged in immediate communication with the rotation breaker 19 are preferably secured to the rotation breaker 19 on its upper or lower edge. The vertical expanse of the rotation breaker 19 corresponds essentially to the vertical expanse of the inlet 13.

By configuring the plates 20 such that they have the largest width at the rotation breaker 19 and then decrease in pace with the distance to the rotation breaker 19 being increased and seen against the flow direction, the effect is accomplished that the flow of gas is distributed more uniformly around the filter 1, in upwards as well as downwards directions.

That means that the gap produced between the inner side of the filter housing 2 and the plates 20 can be configured such that the distance between the gap is changed more or less evenly or such that the change takes place in leaps.

The plates 20 may extend along the entire circumference of the cylindrical inner part 14 without a gap being formed between the plate 20 and the inner side of the filter housing 2. Instead the plate 20 or the plates is (are) provided with holes, which holes may have different sizes. The holes may also be positioned in accordance with a specific pattern to achieve a particular distribution of gas flow and/or particles.

According to a further embodiment the rotation breaker 19 may be mounted displaceably by ordinary displacement means to the effect that the rotation breaker 19, optionally with plates 20, can be shifted at least along a part of the circumference of the cylindrical inner part 14.

According to yet an embodiment the plates 20 can be configured such that they support on or are secured to the inner side of the filter housing 2 and such that a gap is formed between the plates 20 and the cylindrical inner part 14.

The rotation breaker 19 in the filter 1 may be configured such that at least one of the plates 20 extend(s) along the circumference of the cylindrical inner part 4. According to other embodiments 1 of the filter, the rotation breaker may be configured such that at least one of the plates 20 extend(s) within an interval of between 0-325°, 15-120° or 80-100°, respectively, along the circumference of the cylindrical inner part 4, depending on the dimensions of the filter housing and on the flow rate in the filler and in the filler outlet. Various configurations of the plates 20 are depicted in figures 7 through 10.

The plates may be arranged substantially horizontally or may have a dear inclination. The plates are preferably arranged substantially horizontally or have such inclination that the edge which is free at any time is located at a lower level than an edge, if any, that adjoins or is secured to a substantially vertical face.

From FIGS. 2 and 4 it will appear that the upper part 10 of the filter housing 2 is configured with an opening 18 that can be closed tightly with a door or hatch (not shown). Thereby it is possible to access the filler elements with a view to exchange or inspection. Precisely that option is of major significance in plants where there is no space for top removal of filler elements, which usually takes place by the top part of the filter being dismounted and the filler elements being removed from the top of the filter.

In that the inner wrap does not extend so far up and around the filler elements, a larger accessible area between the upper parts of the filter elements for distributing the amount of gas conveyed across the upper part of the inner wrap results, which yields lower gas rates and less or no wear on the filter elements.

Figure 11:
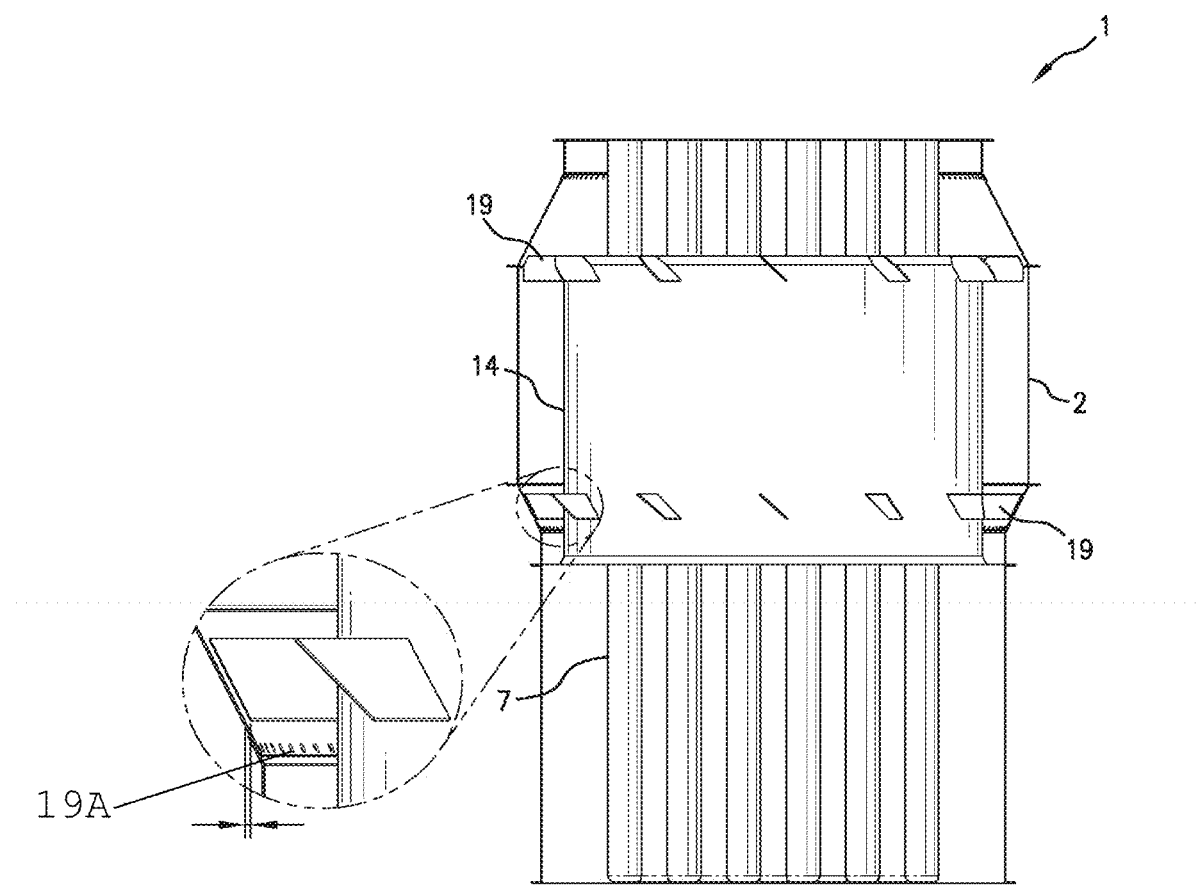
FIG. 11 schematically shows the filler and rotation breaker extending outwards in an angle towards the filler housing.

In FIG. 11, an alternative embodiment of the filter 1 is shown where the rotation breaker 19 is provided by a number of plates formed as protrusions extending from the cylindrical inner part 14 of the filter 1 and extending outwards in an angle towards the filter housing 2.

Figure 12:
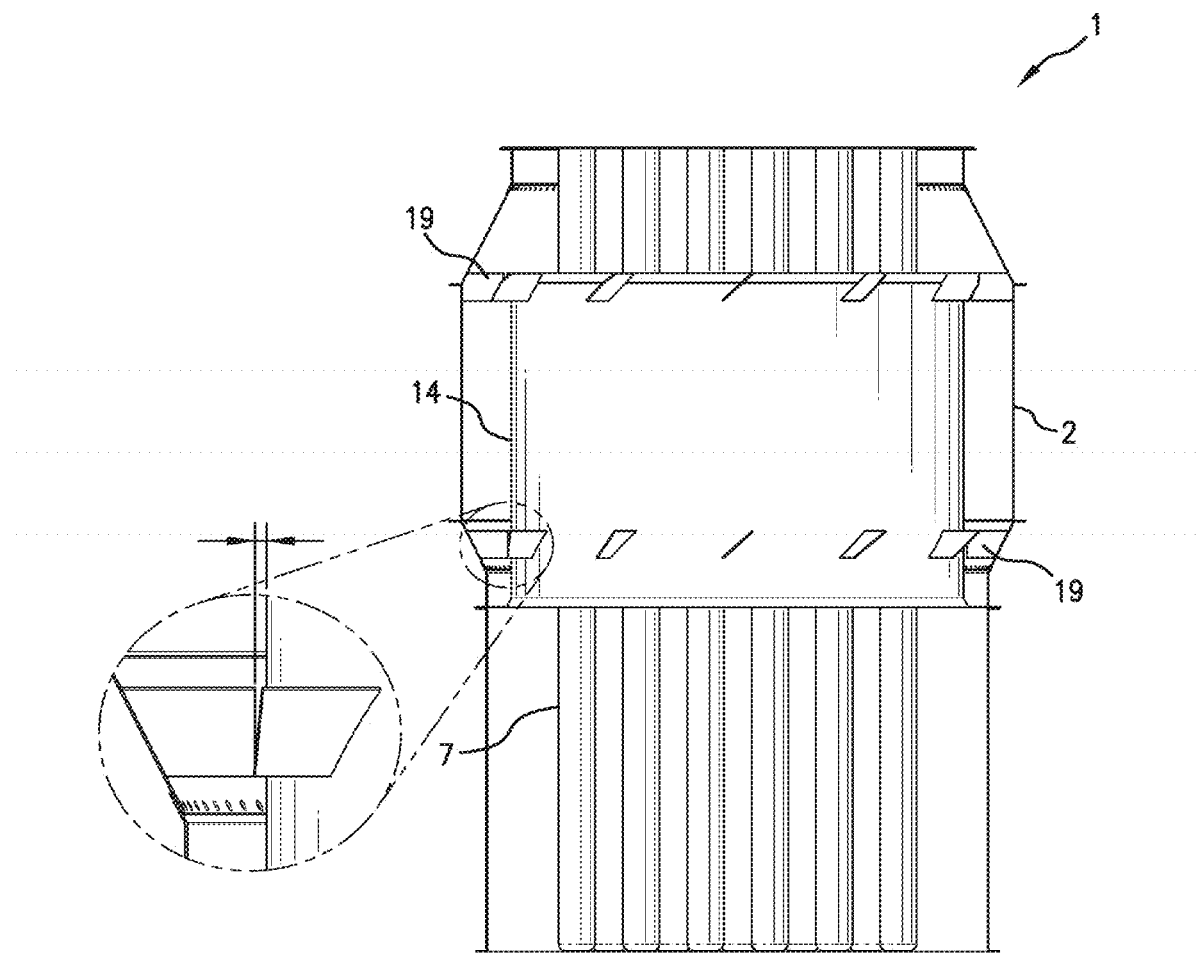
FIG. 12 schematically shows the filler and rotation breaker extending inwards in an angle towards the cylindrical inner part.

In FIG. 12, an alternative embodiment of the filter 1 is shown where the rotation breaker 19 is provided by a number of plates formed as protrusions extending from the inner side of the filter housing 2 and extending inwards in an angle towards the cylindrical inner part 14.

Figure 13:
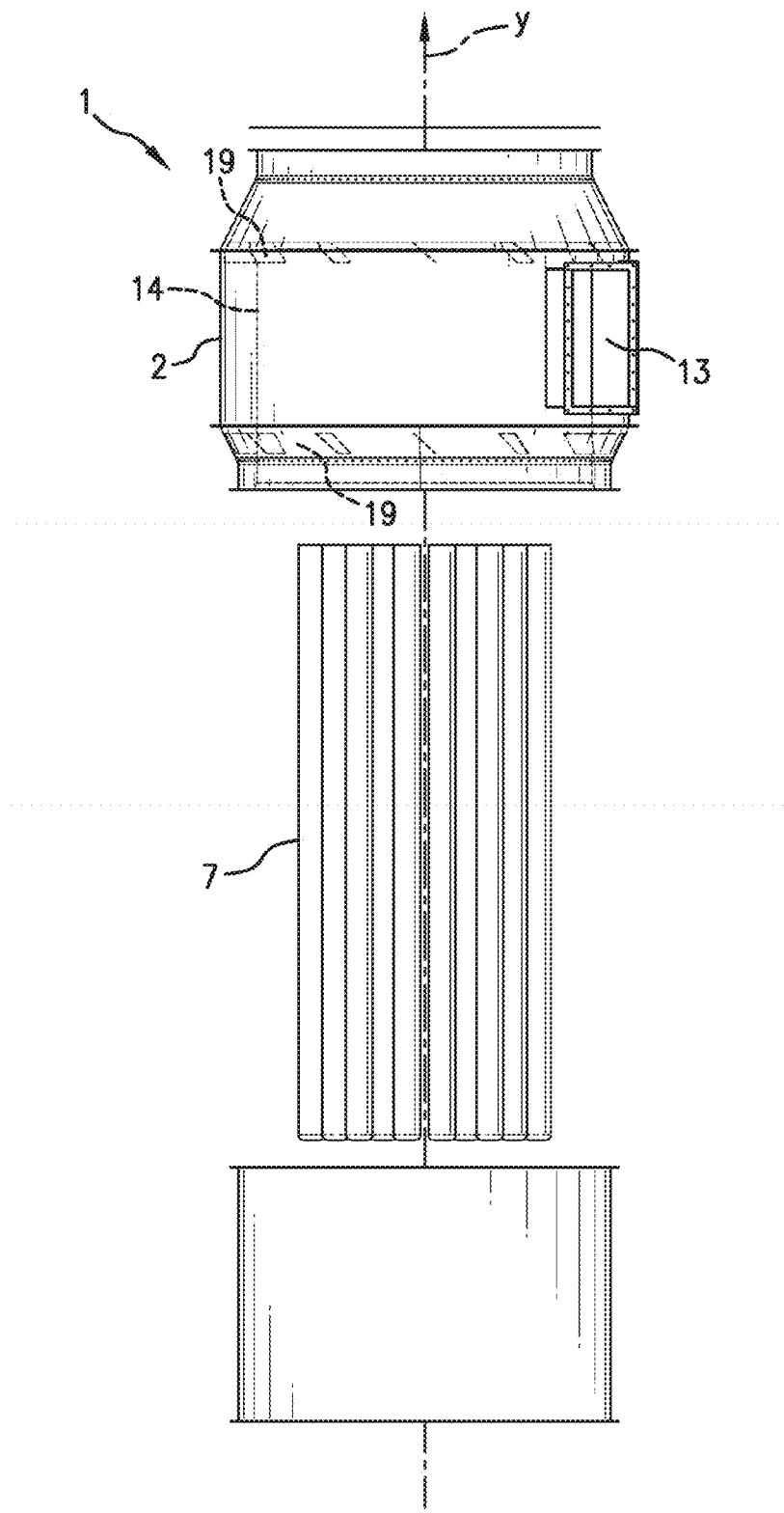
FIG. 13 schematically shows the filler and rotation breakers in relation to a vertical y axis.

In FIG. 13, an alternative embodiment of the filter 1 is shown where the rotation breakers 19 are arranged in a radial direction in relation to a vertical y axis that extends through the centre of the filter 1.

Figure 14:
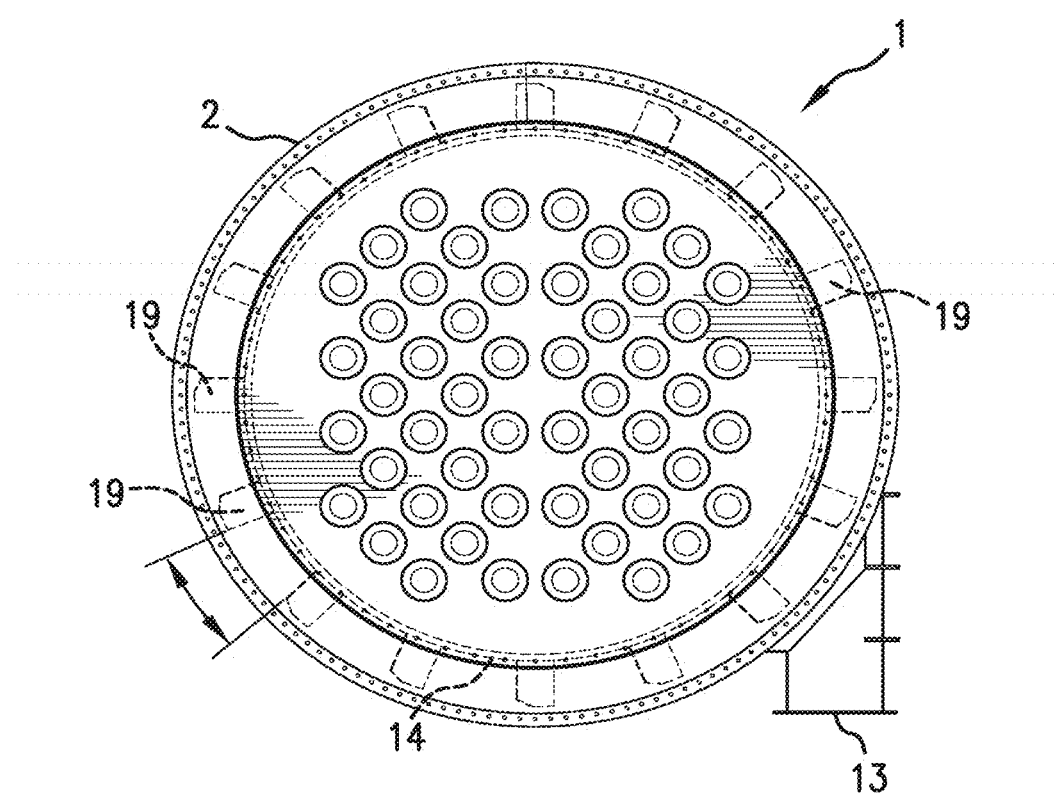
FIG. 14 shows a top view of the filler and rotation breakers arranged with an equal or substantially equal mutual distance between each other.

In FIG. 14, an alternative embodiment of the filter 1 is shown where the rotation breakers 19 are arranged with an equal mutual distance between each other.

Figure 15:
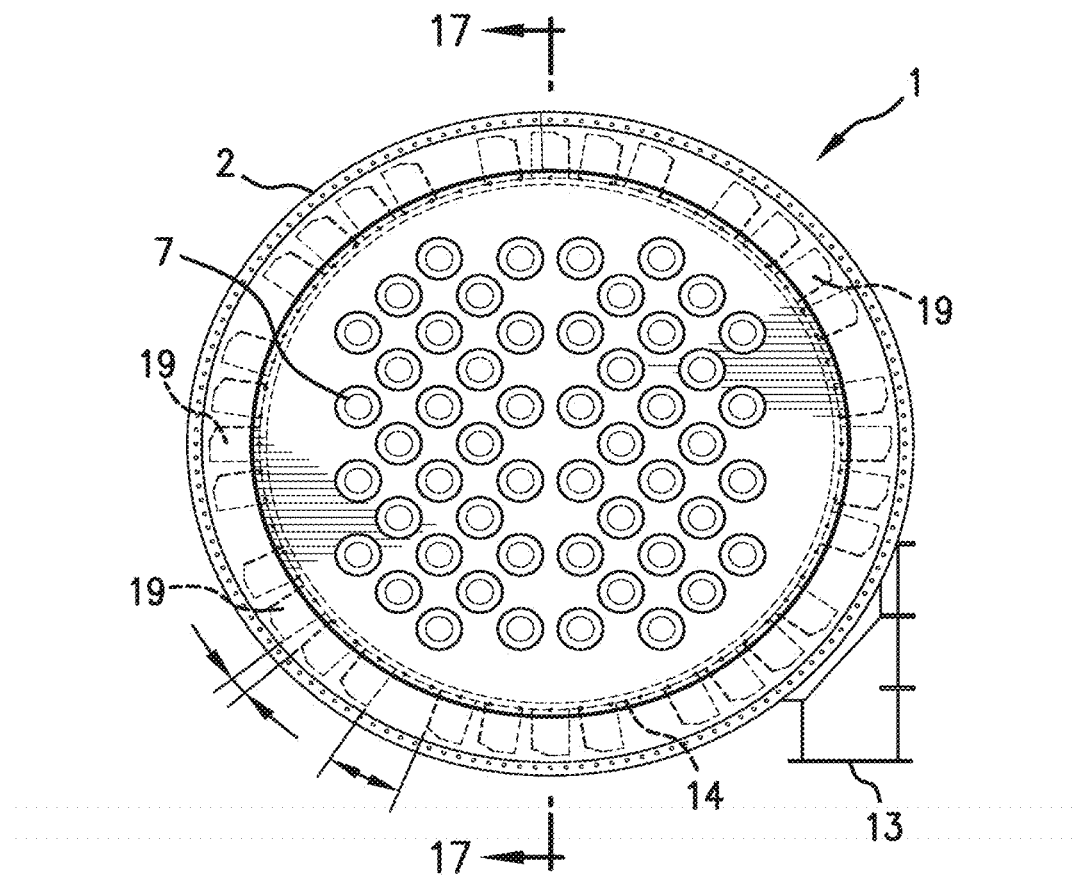
FIG. 15 shows a top view of the filler and groups of rotation breakers arranged with an equal or substantially equal mutual distance between each other.

In FIG. 15, an alternative embodiment of the filter 1 is shown, where the rotation breakers 19 are arranged in groups along an inner perimeter of the filter housing 2, each group distributed with an equal mutual distance between each other.

As is evident, the breakers 19 can be angled along the toroidal direction. For example, in an alternative embodiment of the filter the rotation breakers 19 are arranged in an angle between 0 and 80°, in any desired increment of one degree, in relation to a vertical axis that extends through the centre of the filter 1. If desired, successive breakers can be angled at different angles to achieve different flow effects.

In an alternative embodiment of the filler the rotation breakers 19 are arranged along an upper region of a round going inlet part 8 and a number of protrusions are arranged along the lower region of the round going inlet part 8.

Figure 16A:
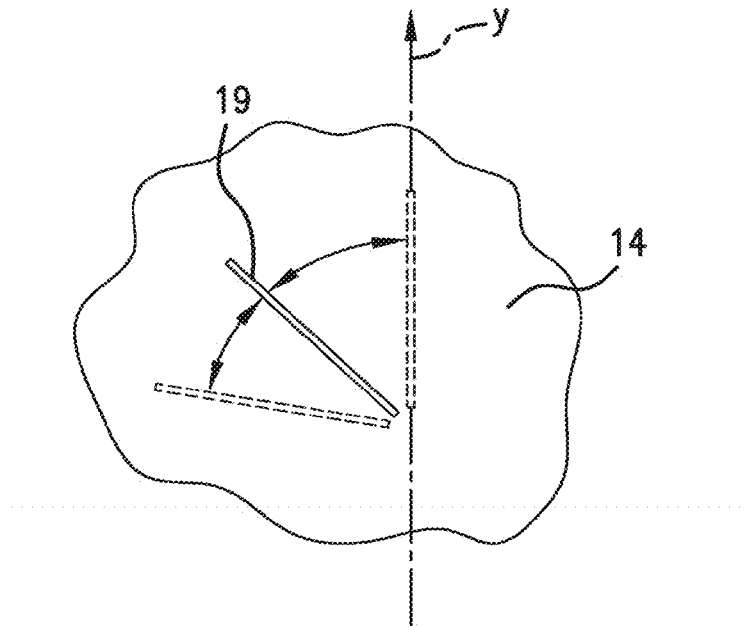
FIG. 16A shows a perspective view of the rotation breaker arranged in preferably a 45° angle in relation to the vertical y axis.

For example, in FIG. 16A, an alternative embodiment of the filler 1 is shown, where the rotation breakers 19 are arranged along the upper region or end of the round going inlet part 8 are arranged in an angle between 0 and 80° in relation to a vertical y axis that extends through the centre of the filter 1, preferably in an angle between 30 and 60°, more preferably 45° in relation to a vertical axis that extends through the centre of the filler 1. As will be appreciated, the breakers 19 can extend outwardly from component 14, or inwardly from the inner surface of the housing 2. In another embodiment, the breakers can extend outwardly from component 14 and inwardly from component 2 in an alternating fashion.

Figure 16B:
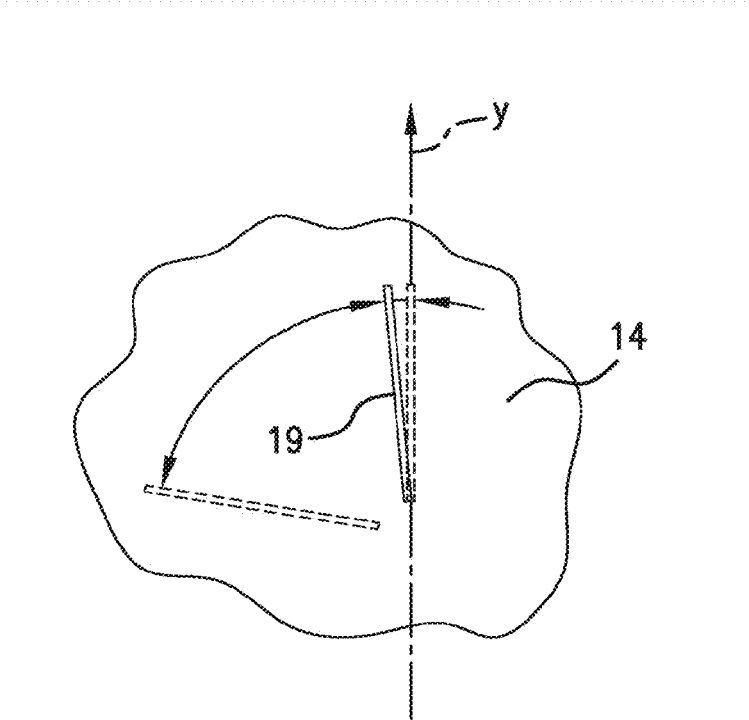
FIG. 16B shows a perspective view of the rotation breaker arranged in preferably a 0-5° angle in relation to the vertical y axis.
Figure 17:
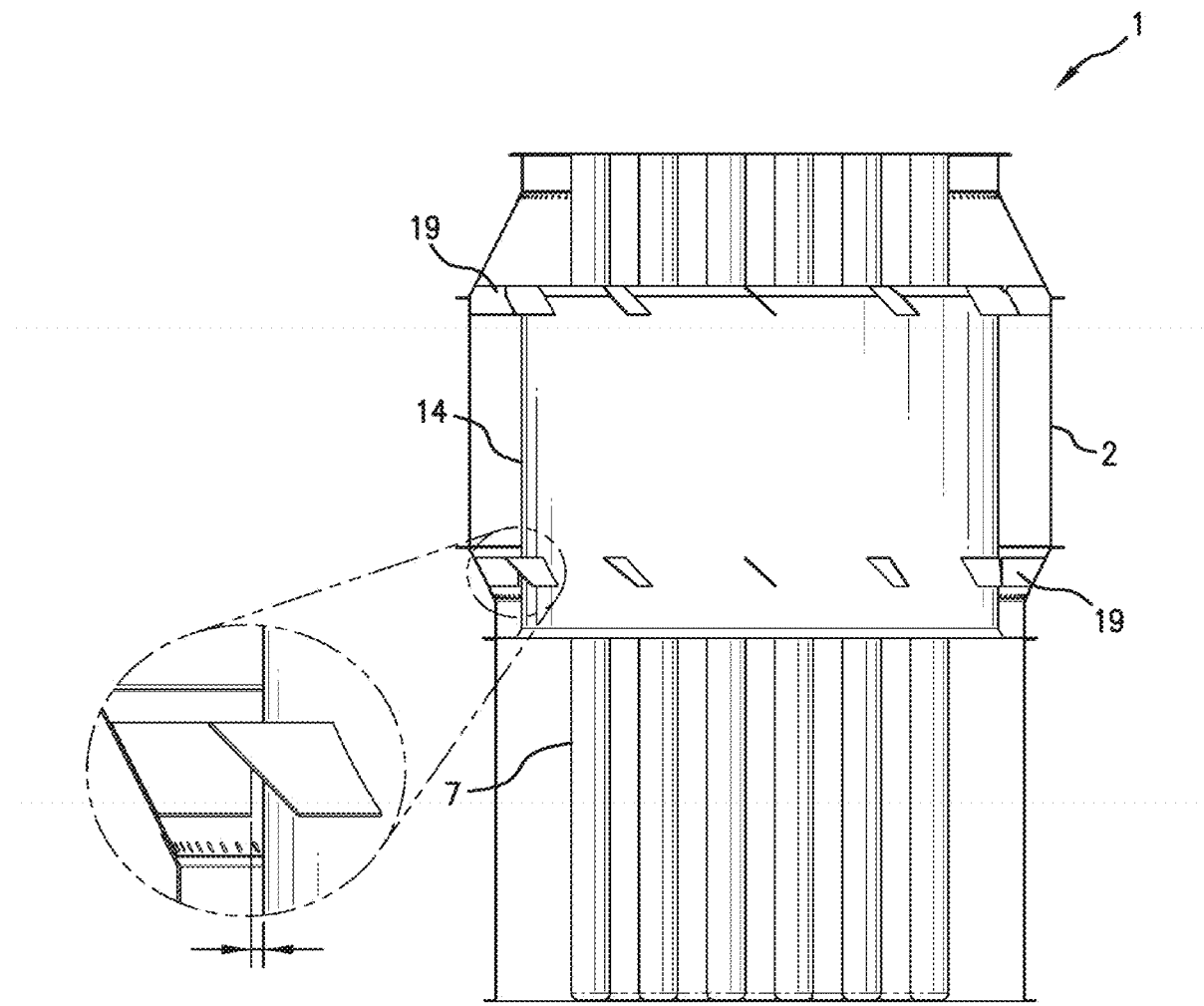
FIG. 17 schematically shows the filter and rotation breakers extending inwards in an angle towards the cylindrical inner part.

In FIG. 16B, an alternative embodiment of the filler 1 is shown, where the rotation breakers 19 arranged along the lower region of the round going inlet part 8 are arranged in an angle between 0 and 80° in relation to a vertical y axis that extends through the centre of the filler 1, preferable in an angle between 0 and 30°, more preferably in an angle between 0 to 5° in relation to a vertical axis that extends through the centre of the filler 1. As will be appreciated, the breakers 19 can extend outwardly from component 14, or inwardly from the inner surface of the housing 2. In another embodiment, the breakers can extend outwardly from component 14 and inwardly from component 2 in an alternating fashion. the rotation breakers 19 are provided by a number of plates formed as In FIG. 17, an alternative embodiment of the filter is shown, where protrusions extending from the inner side of the filter housing 2 and extending inwards in an angle towards the cylindrical inner part 14.

Figure 18:
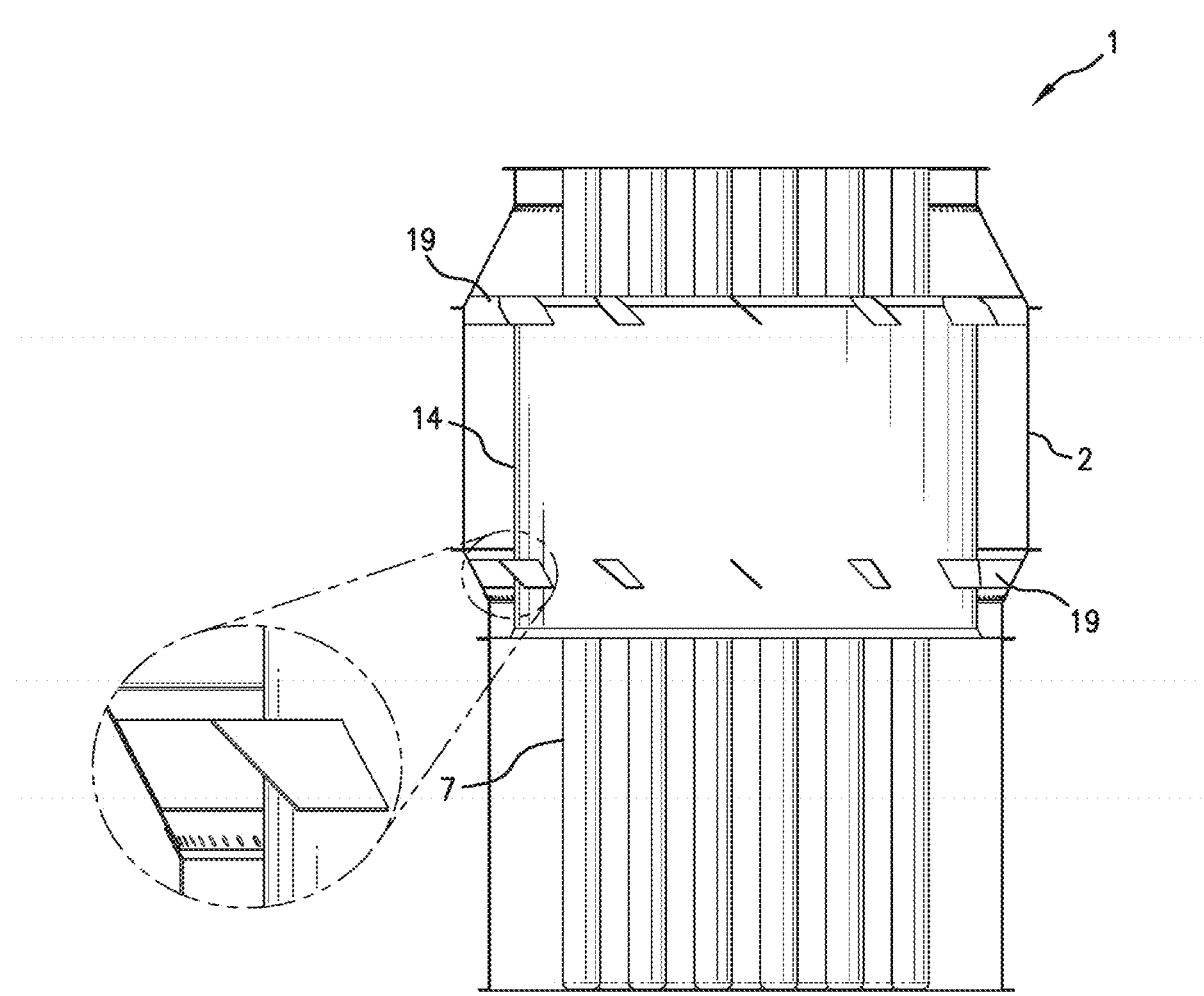
FIG. 18 schematically shows the filler and rotation breakers fixed to the cylindrical inner part and/or the inner side of the filler housing.

In FIG. 18, an alternative embodiment of the filter 1 is shown where the rotation breakers 19 are fixed to the cylindrical inner part 14, to the inner side of the filter housing 2 or a combination hereof.

It is preferred in the context of alternative solutions that the volume of the dust chamber does not become excessive. If, to facilitate exchange of the filter elements, it is attempted to increase the height of the filter housing compared to the inner wrap, an inconveniently large and superfluous volume between the filter elements will occur in the filter with and ensuing increased occurrence of dust particles. Precisely that scenario is undesirable since a dust explosion, if any, will be more difficult to manage and/or limit.

It will be apparent to those skilled in the art that various modifications and variations can be made in the device and method and compositions of the present disclosed embodiments without departing from the spirit or scope of the disclosure.

What is claimed is:

1. A filter having a filter housing, the filter housing comprising:
   a) an essentially horizontal partition wall dividing the filter housing into a clean gas chamber and a dust chamber disposed below the clean gas chamber, the partition wall defining a plurality openings therethrough;
   b) a plurality of filter elements secured to and extending downwardly from the partition wall into the dust chamber;

c) an inlet in fluid communication with the dust chamber, the inlet part being configured to permit passage of a dust-containing flow of gas therethrough into the dust chamber;
d) an outlet in fluid communication with the clean gas chamber for directing a cleaned gas flow out of the filter housing; and
e) a generally cylindrical barrier proximate the inlet disposed between the inlet and the dust chamber surrounding the downwardly extending filter elements, the inlet, cylindrical barrier, dust chamber, and filter elements cooperating to define a flowpath wherein incoming gas into the filter housing is conveyed through the inlet, past the cylindrical barrier filter, through the filter elements, upwardly through the plurality of openings into the clean-gas chamber and out of the filter housing through the outlet, wherein the inlet is divided by the generally cylindrical barrier into a first portion and a second portion, such that the first portion of the inlet is defined over a top of the generally cylindrical barrier into the dust chamber, and the second portion of the inlet is defined under a bottom of the generally cylindrical barrier into the dust chamber, the first portion of the inlet having a flowpath entering the dust chamber over the top of the generally cylindrical barrier defined by a downwardly oriented gas flow, and the second portion of the inlet having a flowpath entering the dust chamber under the bottom of the generally cylindrical barrier defined by an upwardly oriented gas flow, the first portion above the generally cylindrical barrier having a larger cross-section than the second portion below the generally cylindrical barrier.

2. A filter according to claim 1, wherein:
a) the clean gas chamber resides in an upper, cylindrical part of the filter housing;
b) the dust chamber resides in a lower, cylindrical part of the housing; and
c) the inlet resides in an intermediate portion of the filter housing between the upper and lower cylindrical parts of the housing; wherein an outer portion of the intermediate portion of the housing cooperates with the generally cylindrical barrier to define an annular flow space therebetween for inducing flow along a direction that passes along the curvature of the generally cylindrical barrier.

3. A filter according to claim 2, wherein the lower, cylindrical part of the filter housing is connected at a lower end to a conical portion of the filter housing for collecting particles separated from a gas stream passing through the filter housing.

4. A filter according to claim 1, wherein an upper edge of the generally cylindrical barrier is downwardly displaced from an inner surface of the filter housing to define an upper generally annular flow opening between the inlet and the dust chamber.

5. A filter according to claim 1, wherein a lower edge of the generally cylindrical barrier is upwardly displaced from an inner surface of the dust chamber to define a lower generally annular flow opening between the inlet and the dust chamber.

6. A filter according to claim 1, wherein the generally cylindrical barrier is concentrically disposed within an outer wall of the dust chamber.

7. A filter according to claim 1, wherein the generally cylindrical barrier extends downwardly into a conically-shaped portion of the dust chamber.

8. A filter according to claim 1, wherein an opening is defined through an upper portion of the filter housing for removing filter elements.

9. A filter according to claim 1, wherein the inlet is disposed radially outwardly from a central axis "Y" of the filter housing.

10. A filter according to claim 1, wherein the inlet is disposed tangentially along an outer edge of the filter housing.

11. A filter according to claim 1, wherein the generally cylindrical barrier can be moved longitudinally within the filter housing to control the flow through the filter housing.

12. A filter according to claim 1, wherein the filter housing and the generally cylindrical barrier cooperate to define an annular volume therebetween and further wherein the filter further comprises at least one rotation breaker disposed between the filter housing and the generally cylindrical barrier within the annular volume, the at least one rotation breaker being arranged to decrease rotational velocity of a gas flow passing through the filter.

13. A filter according to claim 12, wherein the at least one rotation breaker deflects flow in at least one of an upward and downward direction.

14. A filter according to claim 12, wherein the at least one rotation breaker extends outwardly from the generally cylindrical barrier into the annular volume toward an inwardly facing wall of the housing, wherein the rotation breaker has a free end that defines an elongate gap in cooperation with the inwardly facing wall of the housing, wherein particles entrained in a gas flow are allowed to pass through the elongate gap to facilitate their separation from the gas flow.

15. A filter according to claim 14, wherein the at least one rotation breaker defines one or more holes therethrough.

16. A filter according to claim 12, wherein the at least one rotation breaker includes a plurality of plates formed as protrusions extending outwardly into the annular volume at an angle from the generally cylindrical barrier toward an inner facing wall of the filter housing.

17. A filter according to claim 12, wherein the at least one rotation breaker includes a plurality of plates formed as protrusions extending inwardly at an angle from an inwardly facing wall of the filter housing into the annular volume toward the generally cylindrical barrier.

18. A filter according to claim 12, wherein at least one rotation breaker is radially outwardly oriented in relation to a vertical axis that extends through the center of the filter.

19. A filter according to claim 13, wherein the at least one rotation breaker is arranged at an angle between 0 and 80° in relation to a vertical axis that extends through a center of the filter.

20. A filter according to claim 12, wherein the at least one rotation breaker includes a first plurality of plates formed as protrusions extending outwardly at an angle from the generally cylindrical barrier toward an inner facing wall of the filter housing and a second plurality of plates formed as protrusions extending inwardly at an angle from the inwardly facing wall of the filter housing toward the generally cylindrical barrier.

* * * * *